United States Patent [19]

Brixner

[11] Patent Number: 4,608,190

[45] Date of Patent: Aug. 26, 1986

[54] X-RAY IMAGE STORAGE PANEL COMPRISING ANION-DEFICIENT BAFCL:EU/BAFBR:EU PHOSPHORS

[75] Inventor: Lothar H. Brixner, West Chester, Pa.

[73] Assignee: E. I. Du Pont de Nemours and Company, Wilmington, Del.

[21] Appl. No.: 786,102

[22] Filed: Oct. 15, 1985

Related U.S. Application Data

[63] Continuation-in-part of Ser. No. 603,288, Apr. 23, 1984, abandoned.

[51] Int. Cl.$^4$ ............................................. C09K 11/465
[52] U.S. Cl. ........................... 252/301.4 H; 250/484.1
[58] Field of Search .............. 252/301.4 H; 250/483.1, 250/484.1

[56] References Cited

U.S. PATENT DOCUMENTS

| 4,076,897 | 2/1978 | Joiner ..................... 252/301.4 H X |
| 4,138,529 | 2/1979 | Mori et al. ............... 252/301.4 H X |
| 4,157,981 | 6/1979 | Stevels et al. ............... 252/301.4 H |

FOREIGN PATENT DOCUMENTS 896453   3/1972   Canada ........................ 252/301.4 H Primary Examiner—Jack Cooper

[57] ABSTRACT

Photostimulable, potassium-containing anion-deficient BaFCl:Eu/BaFBr:Eu phosphors and X-ray image storage panels therefrom.

11 Claims, No Drawings

X-RAY IMAGE STORAGE PANEL COMPRISING ANION-DEFICIENT BAFCL:EU/BAFBR:EU PHOSPHORS

CROSS-REFERENCE TO RELATED APPLICATION

This is a continuation-in-part of application Ser. No. 603,288, filed Apr. 23, 1984 now abandoned.

BACKGROUND OF THE INVENTION

1. Field of the Invention

This invention relates to the use of an anion-deficient europium-doped barium fluorochloride and/or fluorobromide composition as the photostimulable phosphor in an X-ray image storage panel.

2. Background

Since the discovery of X-rays, permanent records of X-ray patterns have been made using a photographic emulsion. X-ray intensifying screens are generally used in conjunction with photographic film and serve to enhance the image formed on the film. Phosphors which are the active components of such screens convert X-radiation into photons which are more readily captured by a photographic emulsion to provide a permanent record. The phosphors should be good absorbers of X-ray radiation of the energy used, they should emit light strongly in the region of the spectrum to which the film is sensitive, and they should provide sharp, undistorted film images. Ideally, the emitted light is fluorescent or "prompt" emission, with little or no delayed emission, sometimes called "afterglow", "phosphorescence" or "lag".

Another method of recording images of X-ray patterns is disclosed in U.S. Pat. No. 3,859,527. A temporary storage medium, for example, a photostimulable phosphor panel, is exposed to incident X-rays and, as a result, has temporarily stored therein an image in the form of stored energy, the image being representative of the incident pattern. At some interval after exposure, a beam of visible or infrared light scans the panel to stimulate the release of the stored energy as light so that the emitted light can be detected and, for example, converted to an electrical signal which can then be processed to produce a visible image. For this purpose, the phosphor should store as much of the incident energy as possible and, therefore, emit as little radiation as possible until stimulated by the scanning beam. Ideally, there would be no prompt emission or lag, and all emission occurs upon stimulation.

Europium-doped barium fluorohalides in general, and BaFCl:Eu in particular, have been used in conventional commercial X-ray intensifying screens for some time. The art discloses various processes for preparing the phosphor, as well as the incorporation of additives into the phosphor, all aimed at improving the prompt emission and decreasing lag.

U.S. Pat. No. 3,988,252 discloses a process for making BaFCl:Eu by firing an intimately mixed, substantially stoichiometric mixture of appropriate precursors at 600° C. to 950° C. in a $N_2$, $CO_2$, CO or noble gas atmosphere, and pulverizing the resultant composite mass. Use of hydrogen in the firing step is to be avoided since it causes high lag.

U.S. Pat. No. 4,080,306 discloses a process for making BaFCl:Eu by preparing an intimate mixture of BaFCl particles having a mean spherical equivalent diameter of less than 2 $\mu$m, an europium source, and a chloride flux of at least one water-soluble chloride selected from alkali and alkaline earth metal chlorides, firing the mixture in an inert atmosphere at about 550° C. to about 900° C., but above that necessary to form liquid flux, for a time sufficient to effect reaction and diffusion, and washing the product with water to remove the chloride flux. The chlorides used as fluxes are preferably $BaCl_2$, $MgCl_2$, $CaCl_2$, $SrCl_2$, KCl, NaCl or LiCl, and $BaCl_2$/KCl or $BaCl_2$/$CaCl_2$/KCl are preferred flux mixtures.

Canadian Patent No. 896,453 discloses the use, in intensifying screens, of europium-doped strontium and/or barium chlorides and/or fluorides, prepared by heating the precursors, preferably in a 5% hydrogen in nitrogen atmosphere, at 800°–1200° C. According to the disclosure, the resulting phosphors are such that the cation content, including the activator, is stoichiometric with respect to the anion content.

U.S. Pat. No. 3,951,848 discloses BaFCl:Eu phosphors containing a brightness enhancement additive selected from thallium, lead, and aluminum, the phosphors being fired in a nonoxidizing or slightly reducing atmosphere.

U.S. Pat. No. 4,076,897 discloses the addition of potassium or rubidium salts to a luminescent Eu-activated barium fluorohalide phosphor, at a level of at least 0.001 weight percent of the luminescent phosphor, in order to reduce delayed fluorescence, i e., lag. A preferred composition is $Ba_{0.98}Eu_{0.02}FCl$ with 0.1 weight percent KCl. These phosphors are used in X-ray intensifying screens and are prepared by adding the potassium or rubidium salts to the other component salts of the phosphor composition, after which the resulting composition is then intimately mixed, e.g., in ball or vibrating mills. The milling step is preferably carried out in an organic solvent, although aqueous milling may be used. The resulting suspension is dried and fired at elevated temperatures, as is well-known in the art. The phosphors of the examples of the patent were prepared by firing for 15 minutes at 880° C. under a nitrogen atmosphere.

A. L. N. Stevels and F. Pingault, Philips Research Reports, 30, 277 (1975), in a discussion of the preparation of BaFCl:Eu phosphors for use in X-ray intensifying screens, state that if chlorine vacancies exist, they do not increase the lag (afterglow). This has been shown by adding small amounts of KCl to BaFCl:$Eu^{2+}$, with the result that the lag (afterglow) was lower, rather than higher. The presence of metal vacancies, e.g., effected by the addition of $LaCl_3$, resulted in greatly increased lag (afterglow). A similar effect was realized by heating the BaFCl:$Eu^{2+}$ in gaseous HCl diluted with nitrogen.

U.S. Pat. No. 4,239,968 discloses a method for recording a radiation image using a photostimulable phosphor of the type disclosed in U.S. Pat. No. 4,336,154, infra, the phosphor being at least one selected from alkaline earth metal fluorohalides II FX yA wherein MII is at least one divalent $(Ba_{1-x}M_x^{II})FX:yA$ wherein $M^{II}$ is at least one divalent metal selected from the group consisting of Mg, Ca, Sr, Zn, and Cd, X is at least one of the halogens Cl, Br, and I, A is at least one element selected from the group consisting of Eu, Tb, Ce, Tm, Dy, Pr, Ho, Nd, Yb and Er, and x and y are numbers satisfying the conditions $0 \leq x \leq 0.6$ and $0 \leq y \leq 0.2$, and the wavelength of the stimulation light is not less than 500 nm nor more than 1100 nm. No preparative method for the phosphor is disclosed.

U.S. Pat. No. 4,336,154 discloses a photostimulable boron-containing phosphor which provides "heretofore unattainable high luminance". The phosphor is of the formula $(Ba_{1-x}M_x^{II})F_2 \cdot aBaX_2:yEu,zB$ wherein $M^{II}$ and X are the same as in the aforesaid U.S. Pat. No. 4,239,968 except that $M^{II}$ can also be Be, and a, x, y and z satisfy the respective conditions $0.5 \leq a \leq 1.25$, $0 \leq x \leq 1$, $10^{-6} \leq y \leq 2 \times 10^{-1}$, and $0 \leq z \leq 2 \times 10^{-1}$. Luminances exemplified are up to 1.85 times those of boron-free phosphors at stimulating light wavelengths of 450 to 800 nm. It also is disclosed that when an ammonium halogenide ($NH_4X$) is used as one of the raw materials for the phosphor, there may be times when the halogen (X) is present in excess of the stoichiometric amount in the mixture of raw materials. This excess halogen (X) is expelled from the reaction system in the form of $NH_4X$ during firing. The phosphors are prepared by heating a mixture of the raw materials (e.g., $BaF_2$, $M^{II}F_2$, $BaX_2$ or $NH_4X$, a europium compound and a boron compound) at 600° to 1000° C. for 1 to 6 hours. The heating may be carried out in air, but it is desirable to carry it out in a neutral atmosphere such as argon or nitrogen, or in a weakly reducing atmosphere such as one containing carbon, or an atmosphere of nitrogen containing a small amount of hydrogen gas.

E. Nicklaus and F. Fischer, phys. stat. sol. (b) 52, 453 (1972) discuss the formation of chlorine and fluorine F-centres by X-irradiation and the optical absorption that occurs as a result of their existence. There is no mention of Eu doping, emitted light, or photostimulable X-ray phosphors.

K. Takahashi et al., 163rd Electrochemical Society Meeting, Spring, 1983, San Francisco, Calif., Extended Abstracts, Volume 83-1 (and in J. Electrochem. Soc., 132, 1492 (1985), discuss photostimulated luminescence (PSL) and color centers in europium-doped barium fluorohalide phosphors and conclude that the PSL in these phosphors is caused by the liberation of photoelectrons trapped at halogen ion vacancies in the host crystals.

EPO Publication No. 0 083 085 discloses the preparation of radiation image storage panels containing a bivalent europium activated complex halide represented by formula $BaFX \cdot xNaX':aEu^{2+}$ wherein X and X', each designate at least one of Cl, Br and I, x is $0 \leq x \leq 10^{-1}$ and a is $0 \leq a \leq 0.2$. The firing step used in preparation is conducted in a weak reducing atmosphere, such as nitrogen gas containing a small amount of hydrogen gas.

It is an object of this invention to provide a photostimulable phosphor which is useful in X-ray image storage panels. Another object is to provide X-ray image storage panels. Still another object is to provide an anion-deficient photostimulable phosphor. A further object is to provide a process for preparing such a phosphor. A still further object is to provide an anion-deficient, europium-doped barium fluorochloride and/or fluorobromide phosphor. For further comprehension of the invention and of the objects and advantages thereof, reference may be made to the following description and to the appended claims in which the various novel features of the invention are more particularly set forth.

DETAILED DESCRIPTION OF THE INVENTION

The invention resides in an anion-deficient europium-doped barium fluorochloride and/or fluorobromide which is useful as a photostimulable phosphor in an X-ray image storage panel, being superior in performance to other known compositions. The invention further provides the X-ray image storage panels in which the phosphor layer is comprised of the anion-deficient BaFCl:Eu and/or BaFBr:Eu. The invention also provides processes for making the phosphor.

The anion-deficient europium-doped barium fluorochloride and/or fluorobromide phosphor of this invention, upon absorption of X-rays and subsequent stimulation with light, provides significantly greater amounts of stimulated emission than other commonly-known photostimulable phosphors, including other europium-doped barium fluorochlorides. Moreover, X-ray image storage panels of this invention, with the phosphor consisting essentially of this anion-deficient europium-doped barium fluorochloride and/or fluorobromide, are significantly more sensitive than panels using other known phosphors.

The difficulties in producing photostimulable phosphors can be understood by considering the image storage mechanism. X-ray absorption by the phosphor results in the creation of electron-hole pairs, the number of such pairs being proportional to the energy absorbed. The holes are trapped by the Eu activators. The electrons can be trapped by shallow traps, by deep traps, or by activators that have already captured holes. Electrons trapped by such activators undergo recombination with the hole in a radiative transition, and luminescence results. Some electrons may return to the ground state, i.e., recombine with a hole, by phonon-assisted radiationless transitions. Trapping slows down electron-hole luminescent recombination at the activator. Shallow traps have low activation energies and, therefore, electrons can be thermally activated into the conduction band even at ambient temperatures, and the mobile electron can then undergo the luminescent transition at the activator. Deep traps have high activation energies and, therefore, very few electrons are thermally activated into the conduction band. These electrons can be activated by the absorption of photons when the phosphor is stimulated.

Phosphor used in conventional X-ray intensifying screens in conjunction with photographic film should have as few traps as possible so that the luminescent transition is not delayed, i.e., so that all emission is prompt fluorescence. Phosphor used in photostimulable X-ray image storage panels should have deep traps that can retain the electrons until stimulated by a beam of light. Preferably, the concentration of deep traps is equal to or greater than the concentration of activators. In both uses, i.e., in intensifying screens and in image storage panels, shallow traps are to be avoided since thermal stimulation, with the resultant continuous decaying luminescence (lag), reduces the prompt emission and causes degradation of the image. Shallow traps also cause multiple images on the film in the first use, and they compete with deep traps for electrons and provide a way for the electrons to prematurely recombine and thus reduce the stimulated emission in the second use.

The anion-deficient phosphor of this invention has been found to have the necessary properties to make excellent photostimulable phosphor and it is believed that the anion deficiencies provide the necessary trapping.

The anion-deficient phosphor of this invention can be made by heating europium-doped barium fluorochloride and/or fluorobromide, which is prepared by any commonly used method for utility in a conventional X-ray intensifying screen, in a hydrogen-containing inert gas atmosphere, e.g., nitrogen, a noble gas, carbon dioxide or carbon monoxide, to remove some of the fluorine, chlorine and/or bromine. More specifically, in the first step, conventional europium-doped BaFCl and/or BaFBr phosphor of the type used in X-ray intensifying screens, i.e., with high prompt emission, low lag, and low stimulable emission, is prepared by any of the known processes, preferably by the processes of U.S. Pat. No. 3,988,252 or U.S. Pat. No. 4,080,306, supra. In the second step, the phosphor is charged into an inert container, e.g., an $SiO_2$ boat, and heat-treated at a temperature of about 750°–900° C. for about $\frac{1}{2}$ to 15 hours in an atmosphere of an inert gas, such as noted above, containing about 1 to 3% by volume of hydrogen. The resultant phosphor is the anion-deficient phosphor of this invention and for which the stimulated emission is increased by one or two orders of magnitude over that of the phosphor produced in step 1 of the process, i.e., conventional phosphor. Although not preferred, the preparative process can be carried out in one step by incorporating the hydrogen/argon heat treatment into the firing portion of the first step.

The phosphor can be prepared by starting with appropriate amounts of precursors to form the phosphor of the formula $$Ba_{1-(a+b+c)}K_{(a+c)}Eu_bF_{1-a}X_{1-c}\phi_{(a+c)}$$

where
X = at least one of Cl and Br,
$\phi$ = anion deficiencies,
a = 0 to about 0.05,
c = 0 to about 0.05,
a + c = 0.0005 to about 0.05, and
b = about 0.001 to about 0.02,
heating an intimate mixture of the precursors at 550°–950° C. in an inert gas atmosphere, such as nitrogen, a noble gas, carbon dioxide or carbon monoxide, containing about 1 to 3% by volume of hydrogen for a time sufficient to allow reaction of the precursors to form the above phosphor. Alternatively, the heat treatment with hydrogen can be carried out subsequently to a heat treatment in an inert gas atmosphere. Preferably, in the above formula a+c=about 0.005 to about 0.02 and b is about 0.01. Also preferred in the above formula, a is 0 and c is about 0.005 to about 0.02, more preferably about 0.01.

Evaluation of the Anion-deficient Phosphor

A. Sample Preparation

The anion-deficient phosphor is sieved through a 200 mesh sieve (U.S. Sieve Series) and the following components are measured into a 15 mL-vial containing eight 3 mm-diameter glass beads:
 3.75 g of phosphor
 1.0 mL of butyl acetate
 2.5 g of polyvinyl butyral binder.
The mixture is shaken on a Spex ® oscillatory-type shaker for 15 minutes, then immediately coated onto a cardboard support using a Goodner mechanical coater and a 30-mil (760 μm) draw-down knife to provide a phosphor coating of 30 mils (760 μm) wet. The resulting coating is dried in air for at least 15 minutes.

B. Sample Testing

Prompt emission is measured as follows:

The anion-deficient phosphor on cardboard sample is exposed to 30 kVp Mo radiation. The prompt emission, the light emitted while the phosphor is undergoing exposure to the X-ray beam, is measured directly by focusing the light onto a photomultiplier which detects the light and produces a current which is proportional to the intensity. This measure of intensity is compared with that obtained from a sample made with $CaWO_4$ of the type used in the commercially available Du Pont Cronex ® Hi-Plus intensifying screen. The intensity of the $CaWO_4$ source is arbitrarily set equal to 1, so that the prompt emission (P) preported is a ratio of the intensity of emission of the anion-deficient phosphor to that of the $CaWO_4$.

Photostimulable emission is measured as follows:

The anion-deficient phosphor on cardboard sample is exposed at a distance of 32 cm from a tungsten source filtered by 3 mm-thick aluminum. The tungsten anode is operated at 80 kVp and 3 mA with an exposure time of 10 seconds. Following this X-ray exposure, the sample is transferred in darkness to a measurement apparatus which provides a stimulating light source, a photometer for characterizing the amount of light emitted from a specified area of the sample, and two sets of filters. The first filter assures purity of the stimulating light, and the second filter rejects the stimulating light, while allowing the emitted light to pass to the photometer.

The light source is a type DZA tungsten halogen lamp, nominally rated at 10.8 V and 30 W, but operated at 10.0 V for longer life and repeatable light output. This source is optically projected onto the sample to provide a uniformly illuminated disk of light 1.3 cm in diameter. Before the light reaches the sample, it is filtered with a Bausch and Lomb filter #3228 to provide a pass band centered at 633 nm with full width at half maximum values of approximately ±20 nm. This choice of pass band approximates the response from a He-Ne laser operating at 632.8 nm, the preferred stimulating light.

The stimulating beam is incident normal to the plane at the sample. The emitted light is measured by an R645 phototube manufactured by Hamamatsu and placed 2½ inches (6.4 cm) from the sample at a 45 degree angle. Placed immediately in front of the phototube are two Corning filters, Nos. 5–57 and 4–97. The 50% pass band point of the first filter is 370–530 nm, and that of the second filter is 360–600 nm. The first filter is sufficient for rejecting the 633 nm stimulating illumination and the second is included for optional operation with 1.0 micrometer stimulation since the 5–57 filter also has an IR pass band.

The photometer circuit is assembled from standard components to provide an output of one volt for $1 \times 10^{-10}$ ampere phototube current. The signal voltage is digitized and sent to a Hewlett-Packard HP9825 computer by a Hewlett-Packard 5300B/5306A voltmeter The signal analysis can be plotted by the computer. The plot of phototube current versus time obtained from the photo-stimulable emission measurement is comprised of three regions:

(i) the first consisting of a measurement made with no sample present and no stimulating illumination, (ii) a second region consisting of a measurement made with the sample present but no stimulating illumination, and (iii) a third region consisting of a measurement of 100 seconds duration made with the stimulating light illuminating the sample.

The second region provides a measure of lag which is detrimental to phosphor performance in image storage panels (and, also, in intensifying screens). The phototube, which is the first element in the process of converting the photo-stimulated emission to an electrical signal, detects light from a region much larger than the immediate region of the image storage panel being stimulated at a given instant, typically 4000 times the area of the immediate region of the image storage panel being stimulated at a given instant. This is acceptable if the photo-stimulable phosphor used is a phosphor of the instant invention, that is, one which shows extremely little or no detectable lag as measured in (ii) above, so that substantially all of the light detected by the phototube is light emitted by the immediate region of the image storage panel being stimulated. However, because light is detected from such a relatively large area of the image storage panel compared to the area of the immediate region being stimulated at a given instant, even small amounts of lag cause degradation of the image and render a phosphor exhibiting such lag useless for image storage panels. The magnitude of the phototube current in this second region is a measure of the lag and will be referred to as LAG in the discussion which follows.

The third region provides a measure of the photostimulable emission. For a phosphor exhibiting the kind of photostimulable emission necessary for an image storage panel, light emission from the storage panel increases dramatically to a maximum or peak value when the sample is illuminated with the stimulating light and the corresponding increase in phototube current is evident in the graph of phototube current versus time obtained from the photostimulable emission measurement. The magnitude of the phototube current corresponding to this maximum or peak value will be referred to as PEAK in the discussion which follows. The light emission and the corresponding phototube current decrease from the peak value as illumination of the sample with the stimulating light is continued for the 100 second interval. Since the filters do not completely reject the stimulating light, the area under the curve in this third region of the graph must be corrected by subtracting the contribution of that portion of the phototube current corresponding to the stimulating light. The resulting area is calculated by the computer. This area is a measure of the photostimulable emission intensity of the phosphor and enables comparison of stimulated light output from various phosphors. This area is in units of coulombs and the photostimulable emission, A, reported in the Examples and in the Experiments is $10^{10}$ times this area. Typical repeatability for a given phosphor is ±5%.

Phosphors useful in image storage panels have photostimulable emission A greater than 0.5, preferably greater than 1 and most preferably greater than 2 and a LAG to PEAK ratio of less than 0.005. Many of the phosphors of the invention have no detectable LAG. All of the Examples of the invention have LAG to PEAK ratios less than 0.005 and photostimulable emissions (A) of greater than 0.50.

EXAMPLE 1

Conventional phosphor was prepared as follows 4.183 grams of $EuF_3$, 84.163 g of $BaF_2$, 114.54 g of $BaCl_2$ and 0.058 g of KCl were milled with 200 mL of Freon ®TMS Solvent, a constant boiling blend of trichlorotrifluoroethane and methanol with a stabilizer, for 5 h. The amount of $BaCl_2$ used is 10 wt % in excess of that required by stoichiometry. This excess $BaCl_2$ serves as a flux. This blend was then filtered and dried at 120°–130° C. The dried cake was broken up and passed through a 30 mesh sieve (U.S. Sieve Series). The powder was then charged into a silica boat, fired in pure $N_2$ at 750° C. for about 70 minutes, and then cooled. After washing the fired product to remove the chloride flux, and filtering, some of the phosphor was incorporated into a 30 mil (760 μm) wet screen and measurements of the prompt emission (P) and the photostimulable emission (A) were carried out, as described above. The results were: P=2.25 and A=0.02.

Another portion of the same phosphor was charged into the silica boat and fired at 800° C. for 1 hour in an argon atmosphere containing 2% $H_2$ to produce anion-deficient phosphor of the formula $Ba_{0.979}K_{0.001}Eu_{0.020}F_{1.000}Cl_{0.999}\phi_{0.001}$. A screen of the same thickness (30 mils wet, 760 mm) was made using this anion-deficient phosphor and the emissions were measured. The results were: P=1.56 and A=0.59.

In order to demonstrate that deficiencies are created by the firing in the argon/2% hydrogen atmosphere, a portion of conventional phosphor was again fired at 800° C. for 1 hour in an argon/2% hydrogen atmosphere and the exit gas was passed through a solution of $AgNO_3$. X-ray data on the precipitate confirmed the presence of AgF and AgCl. The photostimulable emission of this treated phosphor (now anion-deficient) was measured and found to be A=0.66.

To demonstrate that anion deficiences are necessary to generate deep trapping centers, a screen which was made with the conventional phosphor was exposed to 30 kVp Mo X-rays for 90 seconds; no coloration of the screen could be seen. When a screen made with the anion-deficient phosphor of the invention underwent the same exposure, there was a strong purple/brown image of the X-ray beam.

EXAMPLE 2

Another phosphor was prepared in the manner of Example 1 except that the amount of $EuF_3$ used was 2.0915 g. The emissions for the conventional phosphor, i.e., before the argon/$H_2$ treatment, were P=2.44 and A=0.01. After the argon/$H_2$ treatment, the emissions of the resulting phosphor of the formula $Ba_{0.979}K_{0.001}Eu_{0.020}F_{0.9998}Cl_{0.9992}\phi_{0.001}$ were P=0.94 and A=0.89.

EXAMPLE 3

Another phosphor was prepared in the manner of Example 1 except that the amount of $EuF_3$ used was 1.046 g. The emissions before and after the argon/$H_2$ treatment were, respectively: P=1.73 and A=0.01; and P=0.53 and A=0.89. The anion-deficient phosphor was of the formula $Ba_{0.989}K_{0.001}Eu_{0.010}F_{0.9998}Cl_{0.9992}\phi_{0.001}$.

EXAMPLE 4

Example 1 was substantially repeated twice except that the amounts employed were as follows: 12.54 g of EuF$_3$, 252.48 g of BaF$_2$, 344.00 g of BaCl$_2$ and 0.174 g of KCl. The emissions before argon/H$_2$ treatment were P=2.76 and A=0.01; and P=2.75 and A=0.003. After argon/H$_2$ treatment as described above, the emissions were P=0.94 and A=1.00; and P=1.43 and A=0.70. The anion-deficient phosphor was of the formula Ba$_{0.979}$K$_{0.001}$Eu$_{0.020}$F$_{1.000}$Cl$_{0.999}$$\phi_{0.001}$.

EXAMPLE 5

Still another conventional phosphor was made in accordance with the procedures of U.S. Pat. No. 3,988,252. The phosphor contained about 0.01 mole of Eu and 0.01 mole of K per mole of cation and had emissions of P=1.93 and A=0.06. After argon/H$_2$ treatment as described above, the resulting anion-deficient phosphor of the formula Ba$_{0.984}$K$_{0.006}$Eu$_{0.010}$F$_{0.999}$Cl$_{0.995}$$\phi_{0.006}$ had emissions of P=0.53 and A=0.56.

EXAMPLE 6

Anion-deficient phosphor was prepared using EuF$_2$ rather than EuF$_3$ as the source of Eu. 25 g of BaF$_2$, 33.3 g of BaCl$_2$, 0.553 g of EuF$_2$ and 0.125 g of KCl were blended and processed as in Example 1. Before the argon/H$_2$ treatment, the emissions of the conventional phosphor were P=2.44 and A=0.01. After the argon/H$_2$ treatment, the resulting anion-deficient phosphor of the formula Ba$_{0.985}$K$_{0.005}$Eu$_{0.010}$F$_{0.999}$Cl$_{0.996}$$\phi_{0.004}$ had emissions of P=0.87 and A=1.2.

EXAMPLES 7-10

Four anion-deficient phosphor compositions corresponding to the aforesaid formula Ba$_{1-(a+b+c)}$K$_{a+c}$Eu$_b$F$_{1-a}$X$_{1-c}$$\phi_{(a+c)}$ wherein X=Cl, c=0, b=0.01 and a is 0.001 (Example 7), 0.005 (Example 8), 0.01 (Example 9) and 0.1 (Example 10) were made by blending different amounts of KCl and BaF$_2$ with 10 g of BaCl$_2$ and 0.183 g of EuF$_2$ as in Example 1. Each blend was filtered, dried, broken up and sieved as in Example 1.

A portion of the powder of a particular composition was charged into a silica boat and fired at 850° C. for 2 hours in an argon atmosphere containing 2% H$_2$, and then cooled. After washing and filtering, some of the phosphor was incorporated into a 30 mil (760 μm) wet screen and measurements of the prompt emission (P) and the photostimulable emission (A) were carried out, all as described in Example 1.

The amounts of KCl and BaF$_2$ used, the a in the above formula and the prompt (P) and photostimulable (A) emissions are given in Table I.

TABLE I

| Ex No. | a (In Formula) | KCl (g) | BaF$_2$ (g) | P | A |
|---|---|---|---|---|---|
| 7 | 0.001 | 0.007 | 8.251 | 0.40 | 0.54 |
| 8 | 0.005 | 0.036 | 8.251 | 0.47 | 0.86 |
| 9 | 0.01 | 0.072 | 8.250 | 0.40 | 1.00 |
| 10 | 0.1 | 0.795 | 8.233 | 0.40 | 0.82 |

EXAMPLES 11-15

Five anion-deficient phosphor compositions corresponding to the aforesaid formula Ba$_{1-(a+b+c)}$K$_{(a+c)}$Eu$_b$F$_{1-a}$X$_{1-c}$$\phi_{(a+c)}$ wherein X=Br, a=0, b=0.010, and c is 0.005 (Example 11), 0.010 (Example 12), 0.020 (Example 13), 0.030 (Example 14) and 0.040 (Example 15) were prepared using the following procedure. KBr, EuF$_2$, BaF$_2$ and BaBr$_2$ were mixed by shaking. The mixture was charged into an Al$_2$O$_3$ boat, fired in an argon/2% hydrogen atmosphere at 850° C. for about 2 hours, and then cooled. The product was ball-milled in an agate mill and fired in an argon/2% hydrogen atmosphere at 900° C. for about 2 hours, and then cooled. Some of the phosphor was incorporated into a 30 mil (760 μm) wet screen and measurements of the prompt emission and photostimulable emission were carried out, all as described in Example 1.

The amounts of KBr, EuF$_2$, BaF$_2$ and BaBr$_2$ used, the c in the above formula, and the photostimulable emission A are given in Table II.

TABLE II

| Ex. No. | c (In Formula) | KBr (g) | EuF$_2$ (g) | BaF$_2$ (g) | BaBr$_2$ (g) | A |
|---|---|---|---|---|---|---|
| 11 | 0.005 | 0.040 | 0.129 | 5.841 | 10.000 | 1.34 |
| 12 | 0.010 | 0.139 | 0.221 | 10.000 | 16.947 | 2.64 |
| 13 | 0.020 | 0.167 | 0.133 | 6.024 | 10.000 | 1.35 |
| 14 | 0.030 | 0.256 | 0.136 | 6.152 | 10.000 | 1.03 |
| 15 | 0.040 | 0.348 | 0.139 | 6.285 | 10.000 | 0.52 |

Experiments A to E

As already disclosed above, in order to be useful in an X-ray image storage panel, the phosphor (of this invention) must exhibit a photostimulable emission (A) of greater than 0.50 and a LAG to PEAK ratio of less than 0.005. As will be demonstrated hereinafter, phosphors which have been proposed in the art for use in X-ray intensifying screens exhibit photostimulable emission (A) of ≦0.50 and/or a LAG to PEAK ratio of much greater than 0.005. The following experiments were carried out to demonstrate that known phosphors which may be useful in X-ray intensifying screens are not useful in X-ray image storage panels because the requirements for the two utilities are markedly different. Regarding Experiments B to E, the teachings for the preparation of the respective Example in the patent was followed in preparing the phosphor. In each instance the phosphor was evaluated as described herein, that is, samples were prepared and prompt and photostimulable emissions were measured as described herein.

A. Comparison of an X-ray Image Storage Panel with an X-ray Intensifying Screen

Two phosphor-on-cardboard samples were prepared as described in this specification using the phosphors described in Example 4. One sample contained "conventional" phosphor fired in N$_2$ (P=2.75 and A=0.003). This sample is useful as an X-ray intensifying screen. The other sample contained "photostimulable" anion-deficient phosphor (P = 1.43 and A =0.70) of the invention corresponding to the formula Ba$_{0.979}$Eu$_{0.02}$K$_{0.001}$F$_{1.000}$Cl$_{0.999}$$\phi_{0.001}$. This sample was prepared by firing the "conventional" phosphor in an argon atmosphere containing 2% H$_2$. This sample is useful as an X-ray image storage panel.

Each sample was exposed to 30 kVp Mo X-rays for 90 seconds. The sample containing the "photostimulable" phosphor has an intensely colored image of the X-ray beam. The sample containing the "conventional" phosphor has no such image.

B. Phosphor of U.S. Pat. No. 4,076,897

A phosphor containing KCl was prepared as described in Example 1 of U.S. Pat. No. 4,076,897. There was no detectable LAG. This absence of LAG corroborates the finding in Example 1 of U.S. Pat. No. 4,076,897 for the KCl-containing sample. The photostimulable emission, $A = 0.01$, of this phosphor is 1/50 to less than 1/250 of the phosphors of the instant invention. Because of this low A the phosphor of U.S. Pat. No. 4,076,897 is not useful as a photostimulable phosphor in an image storage panel.

C. Phosphor of U.S. Pat. No. 4,157,981

A phosphor corresponding to the formula $Ba_{0.95}Eu_{0.05}FCl$ was prepared as described in Example 1 of U.S. Pat. No. 4,157,981. The photostimulable emission, $A = 0.04$, is too low for the phosphor to be useful as a photostimulable phosphor in an image storage panel. In addition, the LAG to PEAK ratio was greater than 0.05, too high for the phosphor to be useful as a photostimulable phosphor in an image storage panel.

D. Phosphor of Canadian Patent No. 896453

A phosphor was prepared as described in Canadian Patent No. 896453, Example 6. The LAG to PEAK ratio was about 0.08 and $A = 0.32$. The LAG to PEAK ratio was too high and photostimulable emission A was too low for this phosphor to be useful as a photostimulable phosphor in an image storage panel.

E. Phosphor of U.S. Pat. No. 4,138,529

A phosphor-I as described in columns 4 and 5 of U.S. Pat. No. 4,138,529, was prepared according to the method disclosed in column 5 of the patent. The composition chosen was the one closest to that of the phosphor of the instant invention, that is, the one with the lowest amount of KCl and listed first under Phosphor-I in Table 2, $BaF_2.BaCl_2.0.2KCl:0.06Eu^{2+}$. The LAG to PEAK ratio of the phosphor was greater than 0.02, too high for the phosphor to be useful as a photostimulable phosphor in an image storage panel. In addition, the photostimulable emission $A = 0.50$, whereas the phosphors of the instant invention have photostimulable emission A greater than 0.50.

BEST MODE FOR CARRYING OUT THE INVENTION

The best mode presently contemplated for carrying out the invention is illustrated by Example 12.

INDUSTRIAL APPLICABILITY

The industrial applicability of the invention is already well established, as is evident by the background and detailed description sections of this specification.

Although preferred embodiments of the invention have been illustrated and described, it is to be understood that there is no intent to limit the invention to the precise constructions herein disclosed and it is to be further understood that the right is reserved to all changes and modifications coming within the scope of the invention as defined in the appended claims.

I claim:

1. Photostimulable, potassium-containing anion-deficient phosphor of the formula

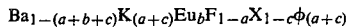

where
- $X =$ at least one of Cl and Br,
- $\phi =$ anion deficiencies,
- $a = 0$ to about 0.05,
- $c = 0$ to about 0.05,
- $a+c = 0.0005$ to about 0.05, and
- $b =$ about 0.001 to about 0.02 exhibiting a photostimulable emission (A) of greater than 0.50 and a LAG to PEAK ratio of less than 0.005.

2. The phosphor of claim 1 wherein $a+c$ is about 0.005 to about 0.02.

3. The phosphor of claim 2 wherein X is Br.

4. The phosphor of claim 1 wherein b is about 0.01.

5. The phosphor of claim 4 wherein X is Br.

6. The phosphor of claim 1 wherein X is Br, a is 0, b is about 0.01 and c is about 0.005 to about 0.02.

7. The phosphor of claim 6 wherein c is about 0.01.

8. The phosphor of claim 1 wherein X is Cl.

9. X-ray image storage panel comprising photostimulable, potassium-containing anion-deficient phosphor of the formula

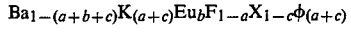

where
- $X =$ at least one of Cl and Br,
- $\phi =$ anion deficiencies,
- $a = 0$ to about 0.05,
- $c = 0$ to about 0.05,
- $a+c = 0.0005$ to about 0.05, and
- $b =$ about 0.001 to about 0.02 , exhibiting a photostimulable emission (A) of greater than 0.50 and a LAG to PEAK ratio of less than 0.005.

10. X-ray image storage panel of claim 9 wherein, in the formula, X is Br.

11. X-ray image storage panel of claim 9 wherein, in the formula, X is Cl.

* * * * *